(12) United States Patent
Choi

(10) Patent No.: US 11,883,899 B2
(45) Date of Patent: Jan. 30, 2024

(54) APPARATUS FOR REPLACING WELDING TIP OF WELDER AND APPARATUS FOR SUPPLYING SAME

(71) Applicant: Kwang-Sul Choi, Ulsan (KR)

(72) Inventor: Kwang-Sul Choi, Ulsan (KR)

( * ) Notice: Subject to any disclaimer, the term of this patent is extended or adjusted under 35 U.S.C. 154(b) by 1091 days.

(21) Appl. No.: 16/583,053

(22) Filed: Sep. 25, 2019

(65) Prior Publication Data
US 2020/0016680 A1    Jan. 16, 2020

Related U.S. Application Data

(62) Division of application No. 15/312,670, filed as application No. PCT/KR2015/004962 on May 18, 2015, now Pat. No. 10,464,162.

(30) Foreign Application Priority Data

May 19, 2014 (KR) .................. 10-2014-0059934
Nov. 6, 2014 (KR) .................. 10-2014-0153921
May 15, 2015 (KR) .................. 10-2015-0068243

(51) Int. Cl.
*B23K 11/30* (2006.01)
*B23K 11/11* (2006.01)
(Continued)

(52) U.S. Cl.
CPC ........... *B23K 11/3072* (2013.01); *B23K 11/11* (2013.01); *B23K 11/36* (2013.01);
(Continued)

(58) Field of Classification Search
CPC ..... B23K 11/3072; B23K 11/11; B23K 11/36; Y10T 483/17
See application file for complete search history.

(56) References Cited

U.S. PATENT DOCUMENTS 2,245,838 A    6/1941  Hall
4,794,221 A *  12/1988  Takabe ............... B23K 11/3072
                                                    219/86.25
(Continued)

FOREIGN PATENT DOCUMENTS

CN    102686353 A    9/2012
DE      3822655 C1   2/1990
(Continued)

OTHER PUBLICATIONS

International Search Report and the Written Opinion dated Aug. 21, 2015 From the Korean Intellectual Property Office Re. Application No. PCT/KR2015/004962 and Its Translation of Search Report Into English. (13 Pages).

*Primary Examiner* — Geoffrey S Evans
(74) *Attorney, Agent, or Firm* — Maschoff Brennan

(57) ABSTRACT

An apparatus for supplying a welding tip of a welder and an apparatus for replacing the same include a fixed bracket secured to a support. The apparatus includes an actuator coupled to the fixed bracket and a first moving member moved by the actuator. A second moving member is coupled to the first moving member and hingedly coupled to the fixed bracket. A third moving member is hingedly coupled to the second moving member. A first welding tip removal member is coupled to the third moving member to separate a welding to tip coupled to a shank. A fourth moving member is disposed opposite to the first moving member. A fifth moving member is coupled to the fourth moving member and hingedly coupled to the fixed bracket. A sixth moving member is coupled to the fifth moving member. A second welding tip removal member is coupled to the sixth moving member.

6 Claims, 17 Drawing Sheets

(51) Int. Cl.
*B23K 11/36* (2006.01)
*B65G 47/90* (2006.01)
*B65G 47/02* (2006.01)
*B65G 47/14* (2006.01)

(52) U.S. Cl.
CPC ......... *B65G 47/02* (2013.01); *B65G 47/1421* (2013.01); *B65G 47/90* (2013.01); *B65G 47/904* (2013.01); *Y10T 483/17* (2015.01)

(56) References Cited

U.S. PATENT DOCUMENTS

| | | | |
|---|---|---|---|
| 7,353,578 | B2 | 4/2008 | Nakajima et al. |
| 9,089,925 | B2 | 7/2015 | Braeuer |
| 2003/0201253 | A1* | 10/2003 | Rigaux .............. B23K 11/3072 219/86.8 |
| 2017/0282284 | A1 | 10/2017 | Nakajima |

FOREIGN PATENT DOCUMENTS

| | | |
|---|---|---|
| FR | 2802455 A1 | 6/2001 |
| JP | H05-96378 A | 4/1993 |
| JP | 05088779 U | 3/1999 |
| JP | 11333654 A | 12/1999 |
| JP | 2002-079381 A | 3/2002 |
| JP | 2002239749 A | 8/2002 |
| JP | 2008-126284 A | 6/2008 |
| JP | 2010-036205 A | 2/2010 |
| JP | 2010172913 A | 8/2010 |
| JP | 2011017764 A | 1/2011 |
| KR | 20-0167627 Y1 | 2/2000 |
| KR | 10-2012-0100701 A | 9/2012 |
| KR | 10-1216192 B1 | 12/2012 |
| KR | 10-1433103 B1 | 8/2014 |
| WO | 2014063721 A1 | 5/2014 |
| WO | WO-2015036971 A1 * | 3/2015 ........... B23K 11/115 |
| WO | 2015178643 A1 | 11/2015 |

* cited by examiner

APPARATUS FOR REPLACING WELDING TIP OF WELDER AND APPARATUS FOR SUPPLYING SAME

FIELD AND BACKGROUND OF THE INVENTION

The present invention relates to a welding tip supplying apparatus for a welder, wherein a welding tip of a welding robot used at a vehicle body manufacturing factory, etc. can be automatically replaced or supplied.

A spot welding method which uses an automatic robot welder, is mainly used at a manufacturing line, for example, a vehicle manufacturing line which is able to manufacture a predetermined product through a mass production method. This spot welding method has a good work efficiency since a heating time is short. Since the spot welding method has a narrow heating range, a residual stress or a deformation occurs less, which may provide a high stability to a welded portion.

A welding gun used for a spot welding method is mounted on a robot, and a shank is installed with the front ends thereof being disposed opposing to each other, and a welding tip at which a welding is actually carried out, is installed at an end portion of the shank. If such a welding tip is repeatedly used, a deformation may occur, for which it needs to periodically replace the welding tip. When this welding tip is exchanged, a replacing work time should be shortened, and a welding tip replacing work should be stably carried out; however such conditions are not actually satisfied, thus causing a problem.

If a welding tip is not provided at a conventional welding tip supplying apparatus, a welding robot cannot recognize the absence of the welding tip, which may make an error when replacing a welding tip, whereby a work efficiency may be degraded.

In the conventional welding tip supplying apparatus for a welder, a predetermined number of welding tips are inserted in an accommodation case, and the welding tips are supplied to the side of the welding gun, and the accommodation case is replaced before all the welding tips accommodated in the accommodation case are all used. In this conventional welding tip supplying apparatus for a welder, it needs to periodically replace the accommodation case in which the welding tips are accommodated, thus causing inconvenience, and if the accommodation case in which the welding tips are accommodated, are not replaced in time, all the manufacturing lines of the automated factory may be affected.

SUMMARY OF THE INVENTION

Accordingly, the present invention is made to resolve the aforementioned problems. It is an object of the present invention to provide an apparatus for replacing a welding tip of a welder wherein a replacing work time is of a welding tip can be shortened, and a welding tip can be stably replaced.

It is another object of the present invention to provide an apparatus for replacing a welding tip for a welder, wherein it is possible to easily check from the outside if a welding tip, which will be replaced, is being continuously supplied, by which a replacing work error of a welding tip can be reduced, thus enhancing a productivity.

It is further another object of the present invention to provide an apparatus for supplying a welding tip for a welder which is made in a simplified structure, and the welding tips can be continuously supplied to a robot welder.

It is still further another object of the present invention to provide an apparatus for supplying a welding tip for a welder wherein if all the welding tips have been consumed, this situation can be reported to a worker or a welding tip replacing error can be prevented by controlling a robot welder.

It is still further another object of the present invention to provide an apparatus for supplying a welding tip for a welder which is able to enhance a productivity in such a way to carry out a welding tip replacing work by minimizing a moving trajectory of a robot welder.

It is still further another object of the present invention to provide an apparatus for supplying a welding tip of a welder which makes it possible to enhance a work efficiency in such a way that a worker is able to easily and detachably attach an apparatus for supplying a welding tip to a support part. It is still further another object of the present invention to provide an apparatus for supplying a welding tip of a welder wherein welding tips are aligned and supplied to a robot welder, and the productivity can be enhanced by reducing the number of works.

To achieve the above objects, there is provided an apparatus for replacing a welding tip of a welder, which may include, but is not limited to, a fixed bracket which is fixed at a support part; an actuator which is coupled to the fixed bracket; a first moving member which is configured to move by the actuator; a second moving member which is coupled to the first moving member and is hingedly coupled to the fixed bracket; a third moving member which is hingedly coupled to the second moving member; a first welding tip removal member which is coupled to the third moving member and is able to separate a welding tip coupled to a shank; a fourth moving member which is configured to move by the actuator and is disposed at the opposite side in response to the first moving member; a fifth moving member which is coupled to the fourth moving member and is hingedly coupled to the fixed bracket; a sixth moving member which is coupled to the fifth moving member; and first welding tip removal member which is coupled to the sixth moving member and is configured to relatively move with respect to the first welding tip removal member.

A first hinge connection member is coupled to the fixed bracket and the third moving member, and a second hinge connection member is coupled to the fixed bracket and the sixth moving member.

The fixed bracket includes a base part which is coupled to the support part; and an extension part which extends from the base part, wherein the second moving member, the fifth moving member, the first hinge connection member and the second hinge connection member are hingedly coupled to the extension part.

The actuator includes a cylinder, and a piston which protrudes from one side or both sides of the cylinder and is configured to move.

A first piston connection member is coupled between the actuator and the first moving member, and a second connection member is coupled between the actuator and the fourth moving member.

The first welding tip removal member is provided with a first engaging part, and the second welding tip removal member is provided with the second engaging part, and the first engaging part and the second engaging part are inserted into a gap between the shank and the welding tip, and any of the first engaging part and the second engaging part is disposed supported by the shank, and the other one of the first engaging part and the second engaging part is configured to move in a state where it is supporting one side of the welding tip.

To achieve the above objects, there is provided an apparatus for supplying a welding tip of a welder, which may include a propping part; an accommodation case which is coupled to the propping part, wherein welding tips are accommodated in the accommodation case; and a welding tip moving part which is coupled to the propping part and is configured to move the welding tips accommodated in the accommodation case, wherein the welding tip moving part includes an actuator; and a moving member which is configured to move the welding tip to one side with the aid of the actuator, and wherein the accommodation case includes a welding tip accommodation groove part which is provided in the inside thereof in the longitudinal direction, wherein the welding tips are inserted into the welding tip accommodation groove part; a guide groove part which is provided at the side surface in the moving direction of the welding tip and is able to guide the moving member; and a discharge port which is coupled to the welding tip accommodation groove part, wherein the welding tip is discharged through the discharge port.

The accommodation case is provided with a welding tip fixing part which is able to limit the movement of the welding tip.

The welding tip fixing part is installed at the accommodation case and is formed of a ball plunger.

The accommodation case is provided with a sensor which is disposed at the side of the discharge port thereof and is able to detect if the welding tip is present or not and transmits a detected signal to a controller.

The accommodation case is provided with a groove part or a protrusion part, and the propping part is provided with another protrusion part or groove part which is inserted in response to the groove part or the protrusion part.

The propping part is coupled to the fixed bracket fixed at the support part, and the propping part and the fixed bracket are disposed at a regular interval from each other, and a cushioning elastic member is disposed between the propping part and the fixed bracket.

The welding tip accommodation groove parts are provided preferably two or more than two in number in parallel to each other.

The welding tip accommodation groove parts are preferably disposed in such a way that the welding tips are disposed opposing to each other, while matching with each other.

It is preferred that the welding tip accommodation groove parts are disposed in parallel for the welding tips to be disposed in the same direction.

To achieve the above objects, there is provided an apparatus for supplying a welding tip of a welder, which may include an aligning part which is configured to align welding tips; a discharge part which is configured to discharge the welding tips from the aligning part; and a fixing part which is configured to fix the welding tips discharged from the aligning part, and wherein the fixing part includes a welding tip holding part which rotates by the driving source and is configured to hold the welding tips transferred from the discharge part.

The welding tip holding part is configured to rotate in the direction where a portion where the welding tip is inserted into a shank provided at a front end of a welding gun, faces downward or upward.

The aligning part is formed of a vibration feeder of a bowl type.

The aligning part includes a welding tip accommodation part wherein a concave groove is provided in the inside thereof; a welding tip moving part which is configured to move in the upward direction the welding tips accommodated in the welding tip accommodation part; a welding tip guide part which is disposed at one side of the welding tip moving part and is configured to align in parallel and guide the welding tips which have been transferred through the welding tip moving part; and a vibration generator which is configured to move the welding tips by supplying a torsion vibration to the welding tip accommodation part, the welding tip moving part and the welding tip guide part, and wherein the welding tip moving part includes a plurality of fixing blocks which are disposed at one side of the welding tip accommodation part, wherein the heights thereof gradually increase in the direction of the welding tip guide part; a moving block which is disposed between a plurality of the fixing blocks and is configured to move upward or downward; and a block moving actuator which is configured to move the moving block.

The discharge part includes a discharge actuator; and a pressing 20 member which is moved by the driving of the discharge actuator and is configured to push the welding tips at the aligning part.

The welding tip holding part is equipped with an accommodation groove part into which the welding tip is inserted, and a ball plunger is employed to fix the welding tip accommodated in the accommodation groove part.

The welding tip holding part includes an accommodation groove part into which the welding tip is inserted, and a ball plunger which is configured to fix the welding tip accommodated in the accommodation groove part.

The welding tip holding part includes a fixing member which is coupled to a driving source; a rotation member which is hingedly coupled to the fixing member and is configured to form an accommodation groove part together with the fixing member, wherein the welding tips are accommodated in the accommodation groove part; and an elastic member which is elastically installed at the fixing member and the rotation member for the fixing member and the rotation member to form the accommodation groove part.

The welding tip holding part is provided with an accommodation groove part in which the welding tips are accommodated, and is formed of a bent elastic plate.

A fixed bracket is disposed at the fixing part, while maintaining a predetermined interval, and a cushioning elastic member is disposed between the fixing part and the fixed bracket.

To achieve the above objects, there is provided an apparatus for supplying a welding tip of a welder, which includes an aligning part which is configured to align welding tips; and a fixing part which is configured to fix the welding tips discharged from the aligning part, and wherein the fixing part includes a welding tip holding part which is rotated by a driving source and is configured to hold the welding tips, and wherein the welding tip holding part includes a fixing member; a rotation member which is coupled to the fixing member and is configured to form an accommodation groove part together with the fixing member, wherein the welding tips are accommodated in the accommodation groove part; and an elastic member which is elastically installed at the fixing member and the rotation member for the fixing member and the rotation member to form the accommodation groove part.

The rotation member and the elastic member can be substituted with a leaf spring.

In the present invention, one between a first welding tip removal member and a second welding tip removal member is configured to support a shank, and the other one is configured to move in a state where it is supporting an end of the welding tip, by which the welding tip can be separated from the shank. In this way, the present invention is able to stably remove the welding tip from the shank.

The welding tip supplying box of the present invention is equipped with a welding tip storing groove part configured to accommodate welding tips, and a direction changing part, so more welding tips can be accommodated in a limited space, and a worker can easily confirm from the outside if an appropriate amount of welding tips are accommodated in the welding tip supplying box through a transparent plate, which makes it possible to prevent any error during a welding tip replacing work, which error may occur due to the lack of welding tips which will be replaced, thus enhancing a productivity.

Moreover, the embodiment of the present invention may be configured in a simplified structure wherein the welding tips are inserted in the accommodation case and are installed at a propping part, and a moving member pushes a welding tip, and the welding tips can be continuously supplied to the welding robot, so the welding tip replacing work of the robot welder can be stably implemented.

In addition, in the embodiment of the present invention, if the welding tip, which will be replaced, is not present at the normal position, a sensor may detect such a situation and may inform to a worker or the welding robot may be controlled to stop a welding tip replacing work, whereupon a welding tip replacing error can be prevented.

Furthermore, the direction of a discharge port of the accommodation case, through which a welding tip is discharged, may be switched the upward direction or the downward direction, so the moving trajectory of the welding robot can be minimized, whereby the replacing work time of the welding tip can be reduced, thus increasing a productivity.

Moreover, in the embodiment of the present invention, since a worker can conveniently and detachably attach the apparatus for supplying a welding tip to the support part, by which the work efficiency can be increased.

The embodiment of the present invention provides a bowl type vibration feeder or an aligning part which is employed to align welding tips by moving upward the welding tips in the straight line direction, and the welding tips can be supplied to the robot welder through a fixing part which is configured to receive the welding tips continuously supplied from the aligning part, so it is possible to prevent the manufacturing line from stopping, which may occur if the supply of the welding tips is interrupted. In the embodiments of the present invention, the number of work processes can be reduced, and the productivity can be increased.

DESCRIPTION OF SPECIFIC EMBODIMENTS OF THE INVENTION

The embodiments of the present invention will be described in detail with reference to the accompanying drawings to the extent that a person having ordinary skill in the art could implement. The present invention may be implemented in various forms, and is not limited to the embodiments which will be described herein. The portions not related with the descriptions will be omitted to clarify the present invention. The same or similar components will be given same reference numbers throughout the specification.

Figure 1:
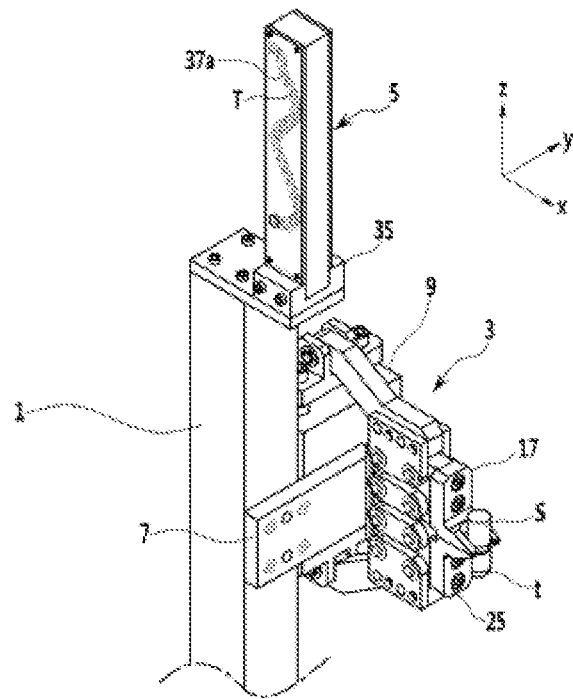
FIG. 1 is a perspective view illustrating an apparatus for replacing a welding tip of a welder according to an embodiment of the present invention.
Figure 2:
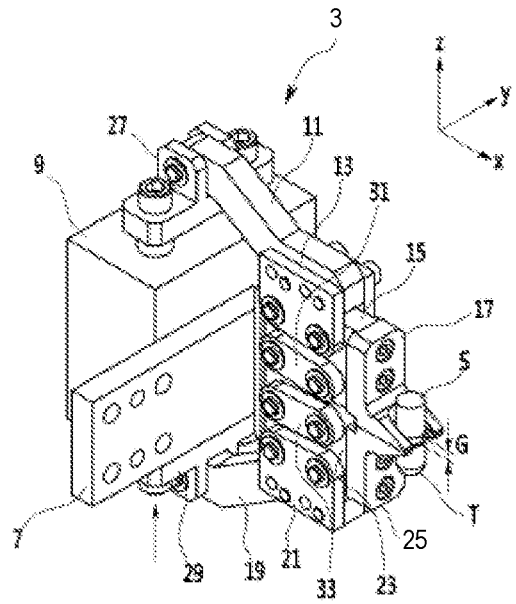
FIG. 2 is a perspective view illustrating a tip separator according to an embodiment of the present invention.
Figure 3:
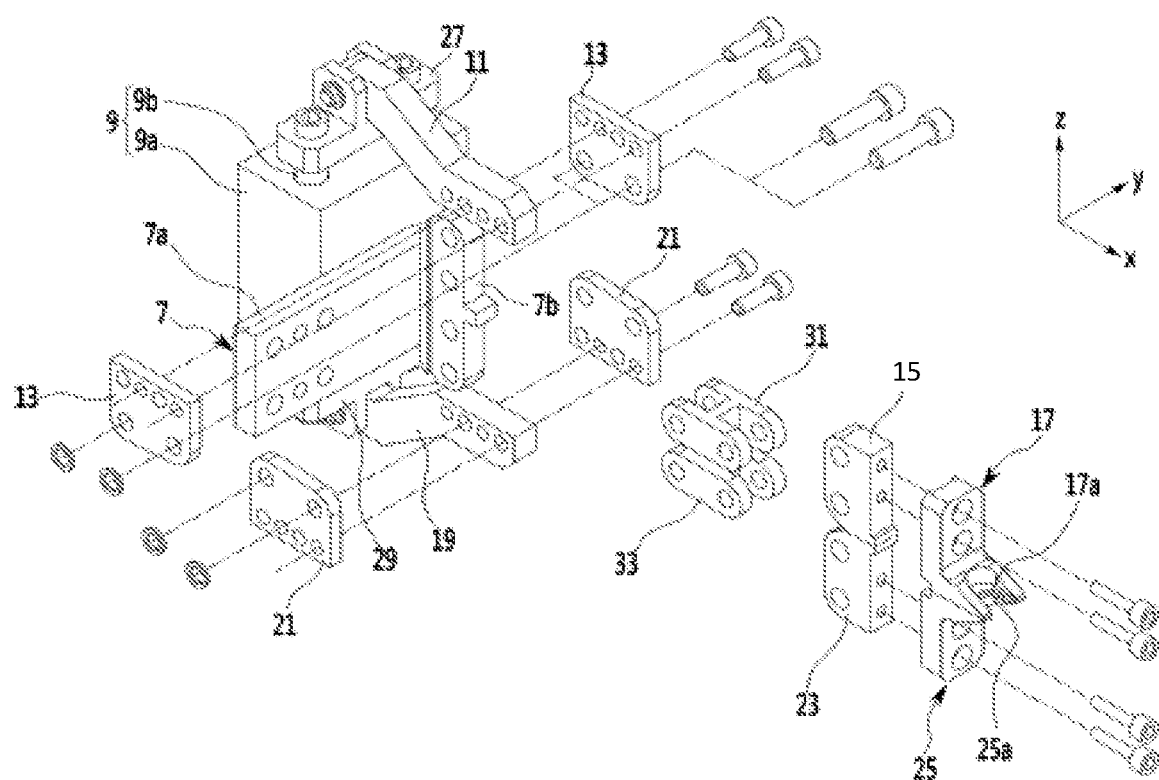
FIG. 3 is a disassembled perspective view illustrating the disassembled major components in FIG. 2.

FIG. 1 is a perspective view for describing an embodiment of the present invention, and FIG. 2 is a perspective view illustrating the major components in FIG. 1, and FIG. 3 is a view illustrating an apparatus for replacing a welding type of a welder.

The apparatus for replacing a welding tip of a welder according to an embodiment of the present invention may include, but is not limited to, a welding tip remover 3 coupled to a support part 1, and a welding tip supplier 5.

Figure 4:
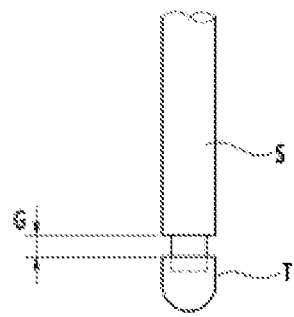
FIG. 4 is a view illustrating a state where a welding tip is engaged to a shank of a welder according to an embodiment of the present invention.
Figure 4:
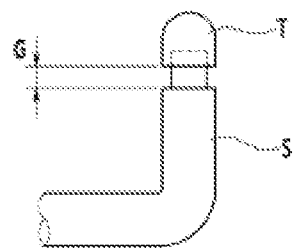

The support part 1 is a kind of a frame which is able to allow to install the welding tip remover 3 and the welding tip supplier 5. The apparatus for replacing a welding tip of a welder according to an embodiment of the present invention is provided with a function for removing a welding tip (T) (refer to FIG. 4) which has been consumed at a shank (S) (refer to FIG. 4), and a function for inserting a new welding tip (T) into the shank (S).

In the embodiment of the present invention, the support part 1 has been described as a fixed type, but it is not limited thereto. The support part 1 may be configured in such a way that the support part 1 itself can be movable upward or downward and leftward or rightward.

As illustrated in FIGS. 2 and 3, the welding tip remover 3 of the embodiment of the present invention may include a fixed bracket 7, an actuator 9, a first moving member 11, a second moving member 13, a third moving member 15, a first welding tip removal member 17, a fourth moving member 19, a fifth moving member 21, a sixth moving member 23, and a second welding tip removal member 25.

The fixed bracket 7 may include a base part 7a coupled to the support part 1, and an extension part 7b extending from the base part 7a (refer to FIG. 3). The base part 7a is provided with a plurality of engaging holes, so it can be coupled to the support part 1 through a coupling member, for example, a bolt. The extension part 7b may be formed integral with the base part 7a and may extend in the right angle direction from an end of the base part 7a. The extension part 7b may be provided with a plurality of engaging holes which are formed at regular intervals.

The actuator 9 may be fixedly coupled to the backside of the fixed bracket 7. The actuator 9 may be driven by pneumatic and may include a cylinder 9a and a piton rod 9b (the reference numbers are given to the portions which can be seen in FIGS. 2 and 3). The piston rod 9b adapted to the embodiment of the present invention is preferably a double rod type. The pneumatic actuator of the double rod type may be configured in such a way that the piston rod 9b can protrude and move in both directions of the cylinder 9a.

A first piston connection member 27 and a second piston connection member 29 may be coupled to the piston rod 9b. The first piston connection member 27 and the second piston connection member 29 are preferably connected to each end of the piston rod 9b. In this way, the first piston connection member 27 and the second piston connection member 29 may be disposed in opposite directions from each other.

The configuration of the actuator is not limited to the description of the embodiment of the present invention, and it may be manufactured using the actuator of a single rod type. The actuator of the embodiment of the present invention may include a hydraulic cylinder, an air cylinder, a motor, etc.

One end of the first moving member 11 may be hingedly connected to the first piston connection member 27. One end of the fourth moving member 19 may be hingedly connected to the second piston connection member 29.

The second moving member 13 may be fixedly coupled to the other end of the first moving member 11, and at the same time, one side of the second moving member 13 may be hingedly coupled to the extension part 7b of the fixed bracket 7. The second moving member 13 may be hingedly coupled to the third moving member 15 at a portion spaced apart by a predetermined distance from the portion which is hingedly coupled to the extension part 7b.

Moreover, the fifth moving member 21 may be fixedly coupled to the other end of the fourth moving member 19, and at the same time, one side of the fifth moving member 21 is hingedly coupled to the extension part 7b of the fixed bracket 7, and the fifth moving member 21 may be hingedly coupled to the sixth moving member at a portion spaced apart by a predetermined distance from the portion which is hingedly coupled to the extension part 7b.

Meanwhile, the extension part 7b of the fixed bracket 7 and the third moving part 15 are hingedly coupled by a first hinge connection member 31. Namely, one side of the first hinge connection member 31 is hingedly coupled to the extension part 7b of the fixed bracket 7, and the other side thereof is hingedly coupled to the third moving member 15.

Moreover, the extension part 7b of the fixed bracket 7 and the sixth moving member are hingedly coupled by a second hinge connection member 33. Namely, one side of the second hinge connection member 33 is hingedly coupled to the extension part 7b of the fixed bracket 7, and the other side thereof is hingedly coupled to the sixth moving member 23. The hinge coupling points of each component during the description on the embodiment of the present invention may be determined as different positions.

The first welding tip removal member 17 may be fixedly coupled to the third moving member 15. Moreover, the second welding tip removal member 25 may be fixedly coupled to the sixth moving member 23.

A groove may be formed at a part of the first welding tip removal member 17, and a first engaging part 17a may be provided at this groove. The first engaging part 17a has a predetermined thickness and width, so it is formed in a protruding shape in the groove and can be inserted into a gap (G) formed between the shank (S) and the welding tip (T).

The second welding tip removal member 25 may have the same shape as the first welding tip removal member 17. Namely, a groove may be formed at a part of the second welding tip removal member 25, and a second engaging part 25a may be provided at this groove. The second engaging part 25a may have a predetermined thickness and width, so it is formed in a protruding shape and can be inserted into a gap (G) (refer to FIG. 4) formed between the shank (S) and the welding tip (T).

The first engaging part 17a of the first welding tip removal member 17 and the second engaging part 25a of the second welding tip removal member 25 may be disposed overlapping each other.

In other words, the total thicknesses of the first engaging part 17*a* of the first welding tip removal member 17 and the second engaging part 25*a* of the second welding tip removal member 25 may be determined smaller than the gap (G) (refer to FIG. 4) between the shank (S) and the welding tip (T). For this reason, the first engaging part 17*a* of the first welding tip removal member 17 and the second engaging part 25*a* of the second welding tip removal member 25 may be inserted together into the gap (G) formed between the shank (S) and the welding tip (T).

One of the first engaging part 17*a* of the first welding tip removal member 17 and the second engaging part 25*a* of the second welding tip removal member 25 may support one side of the shank (S) and the other one thereof may support one side of the welding tip (T). If the first engaging part 17*a* or the second engaging part 25*a* supporting the welding tip (T) moves, the welding tip (T) may separate from the shank (S).

A plurality of the welding tips (T) may be inserted in the welding tip supplier 5, so the welding tip (T) inserted in the shank (S) provided at the robot type automatic spot welder can be continuously supplied. This welding tip supplier 5 may be installed at the support part 1 (refer to FIG. 1). The welding tip supplier 5 may be fixedly installed at the support part 1, but it may be installed detachable, which means that it can be detached. Namely, the fixing part 35 with a groove can be installed at the support part 1, and the welding tip supplier 5 may be inserted in this groove and maintain a fixed state.

In the embodiment of the present invention, the fixing part 35 may be installed at the support part 1. The welding tip supplier 5 may be inserted in the fixing part 35 and may be fixed using an engaging member, for example, a bolt. This configuration will be described in detail.

Figure 7:
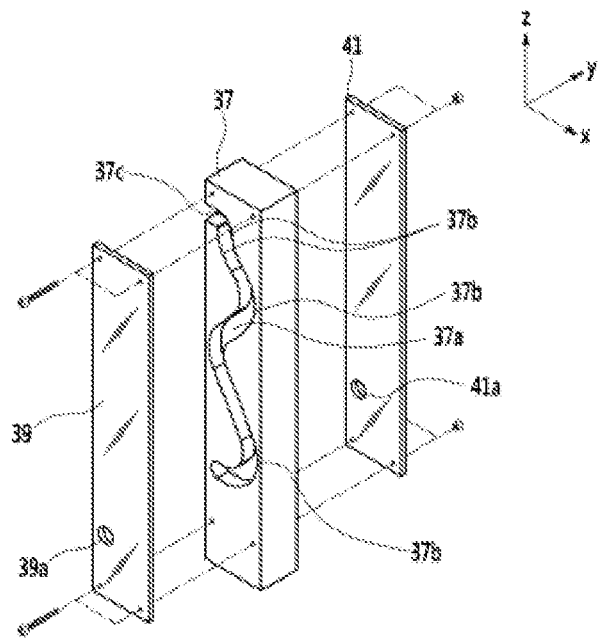
FIG. 7 is a disassembled perspective view illustrating a welding tip supplier according to an embodiment of the present invention.

As illustrated in FIG. 7, the welding tip supplier 5 may include a welding tip supply box 37 and transparent plates 39 and 41.

The welding tip supply box 37 may be formed of a roughly rectangular pillar member. A welding tip storing groove part 37*a* may be formed at a surface of the welding tip supply box 37, wherein the welding tip (T) can be inserted in the welding tip storing groove part 37*a*. This welding tip storing groove part 37*a* may be formed in a groove shape, wherein it is gradually inclined from the top the bottom (refer to FIG. 7).

Figure 8:
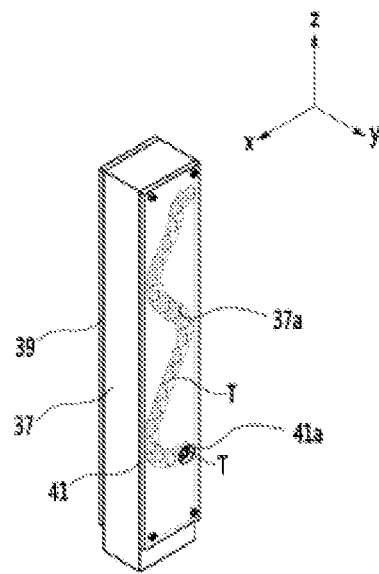
FIG. 8 is a perspective view illustrating the opposite surface after the welding tip supplier in FIG. 7 has been engaged.

This welding tip storing groove part 37*a* is disposed gradually inclined from the top to the bottom and may be equipped with a direction changing part 37*b* (refer to FIG. 7) the direction of which is bent at least one or more time and is changed. This direction changing part 37*b* may contribute to the increased length of the welding tip storing groove part 37*a* at the limited area. In this way, more welding tips (T) can be accommodated in the welding tip groove part 37*a*. Moreover, the welding tip storing groove part 37*a* maintains a predetermined inclination angle from the top to the bottom. The welding tip (T) can easily move toward the lower end of the welding tip storing groove part 37*a* by the self-weight thereof. This welding tip storing groove part 37*a* may be preferably formed in the same shape to match with both sides of the welding tip supply box 37 (refer to FIGS. 7 and 8). The double-side disposing structure of this welding tip storing groove part 37*a* may contribute to the simultaneous insertion of the welding tips (T) into the paired shanks (S).

An input mouth 37*c* may be provided at the upper side of the welding tip storing groove part 37*a*. The input mouth 37*c* corresponds to where the welding tip storing groove part 37*a* communicates with the outside of the welding tip supply box 37. The welding tips (T) can be sequentially inserted into the welding tip storing groove part 37*a* through the input mouth 37*c*. The welding tips (T) are preferably inserted into the welding tip storing groove part 37*a* in such a way that the surface thereof inserted into the shank (S) is disposed at the outer side of the welding tip supply box 37.

In addition, the lower end of the welding tip storing groove part 37*a* is blocked from the outside, so the welding tip (T) can be disposed in a stopped state at a predetermined position.

The transparent plates 39 and 41 may be fixed using an engaging member at both sides of the welding tip supply box 37. The transparent plates 39 and 41 are employed to close the welding tip storing groove 37*a* with respect to the outside, and at the same time, it allows a worker to confirm from the outside that the welding tips (T) are normally loaded in the welding tip storing groove part 37*a*. The worker can check any loading error or loaded states of the welding tips (T) through the transparent plates 39 and 41, by which the welding tips (T) can be continuously supplied to the shank (S).

Meanwhile, in the transparent plates 39 and 41, a welding tip ejection mouth 39*a* (in FIG. 7, only the visual portion is given reference number) may be provided at a portion corresponding to a lower end of the welding tip storing groove part 37*a*.

The welding tip ejection mouth 39*a* may have a diameter large enough let the welding tip (T) to pass, so the welding tip (T) can be fixed at the shank (S) through the same.

The operations of the embodiment of the present invention will be described in detail.

First, if it needs to remove the welding tip (T) coupled to the shank (S) of the automatic welder, the gap (G) (refer to FIG. 2) to which the shank (S) of the automatic welder and the welding tip (T) have been connected, is forced to contact close with the first engaging part 17*a* of the first welding tip removal member 17 and the second engaging part 25*a* of the second welding tip removal member 25. In this way, the first engaging part 17*a* and the second engaging part 25*a* can be inserted into the gap (G) between the shank (S) and the welding tip (T).

Figure 5:
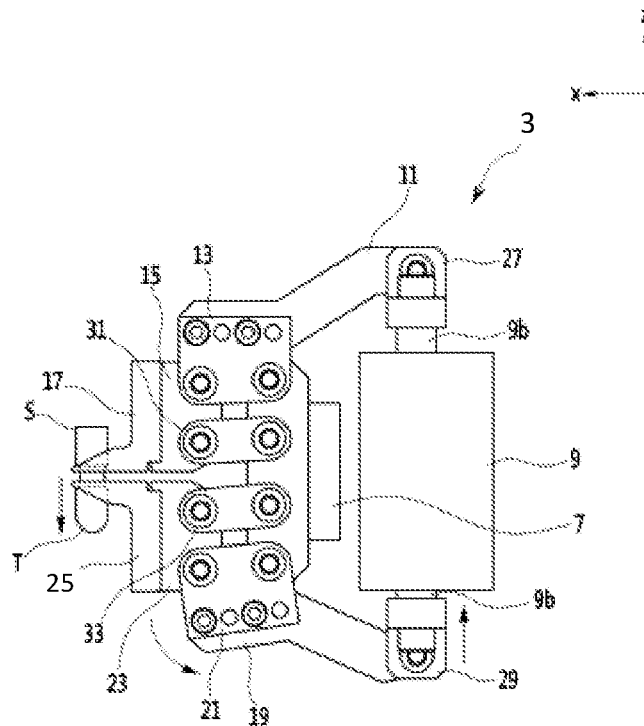
FIGS. 5 and 6 are views for describing an operation procedure according to an embodiment of the present invention.

At this time, the first engaging part 17*a* is supporting the engaging shoulder of the shank (S), and the second engaging part 25*a* is supporting an end of the welding tip (T) (refer to FIG. 5).

In this state, the piston rod 9*b* disposed at the lower end as in FIG. 5 among the pistons 9*b* of the actuator 9 is moved in the solid line arrow direction (the z-direction) in accordance with a control of a separate control device (not illustrated). The fourth moving member 19 coupled integral with the fifth moving member 21 may cause the fifth moving member to move. At this time, the fifth moving member 21 will rotate within a predetermined section in the clockwise direction with respect to the portion hingedly coupled to the extension part 7*b* of the fixed bracket 7 (refer to FIG. 5). As the sixth moving member 23 hingedly coupled to the fifth moving member 21 moves, the second welding tip removal member 25 can move in the arrow direction (as in FIG. 5) (the −z direction). The second engaging part 25*a* moves contacting close with an end of the welding tip (T), and the welding tip (T) can be separated from the shank (S) while moving in the arrow direction (the −z direction).

Figure 6:
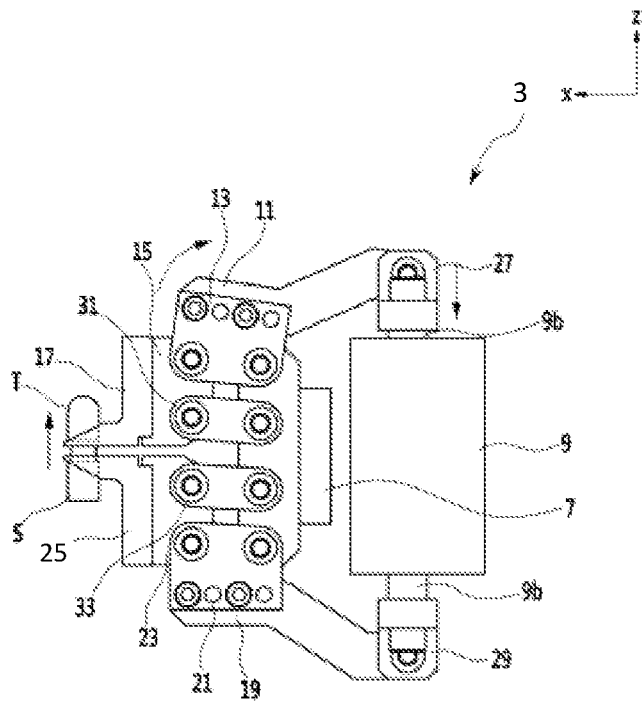

In order to remove another welding tip (T) installed at another position of the shank (S), the welding tip (T) may be disposed in the opposite direction to the shank in FIG. 6. In this case, the piston rod 9*b* disposed at the upper portion (as in FIG. 6) of the actuator 9 may operate and cause the first piston connection member 27 to move downward (the −z direction as in FIG. 6). In this way, the first piston connection member 27 will move in the same direction, and the first moving member 11 will move and at the same time cause the second moving member 13 to move. The second moving member 13 will rotate in the counterclockwise direction about the portion hingedly coupled to the extension part 7*b* of the fixed bracket 7 and cause the third moving member 15 to move in the upward direction (the z-direction). As the first welding tip removal member 17 moves in the upward direction (the z-direction) by the movement of the third moving member 15, the welding tip (T) can be separated from the shank (S).

If the consumed welding tip (T) is separated from the shank (S), the shank (S) is moved toward the welding tip supplier 5. The shank (S) is inserted into the welding tip ejection mouths 39*a* and 41*a* provided at the transparent plates 39 and 41 of the welding tip supplier 5 and are contacted close with the welding tip (T). Then, the welding tip (T) is inserted into the shank (S).

If the shank (S) is moved, the welding tip (T) is ejected from the welding tip ejection mouth 41*a*, and the other welding tips (T) residing in the welding tip storing groove part 37*a* will move by the self-weight thereof to the portions where the welding tip (T) has gone, and the initial state is recovered.

In the present invention, when separating the welding tip (T) from the shank (S), one of the first engaging part 17*a* and the second engaging part 25*a* is supported by the engaging shoulder of the shank (S), and the other one thereof supports and pushes one end of the welding tip (T), thus generating an enough repulsive force, by which the welding tip (T) can be stably removed to from the shank (S).

Moreover, during the procedure for coupling the welding tip (T) to the shank (S), if the welding tip (T) is ejected in the inserted state in the shank (S), other welding tips (T) residing in the welding tip strong groove part 37 will move by the self-weight thereof and are filled in the empty places for the welding tips, and the initial state can be recovered. In the welding tip supply box 37 of the present invention, the welding tip storing groove part 37*a* is configured in the groove shape from the upper side to the lower side and in the zigzag shape, which permits more welding tips (T) to be accommodated as compared to the conventional apparatus, for which the replacing cycles of the welding tip supply box 37 can be delayed.

In the embodiment of the present invention, it is possible to confirm if the welding tips (T) are being continuously supplied from the welding tip supplier 5, by which any errors can be reduced during the replacing work procedure of the welding tip (T), thus enhancing productivity.

Figure 9:
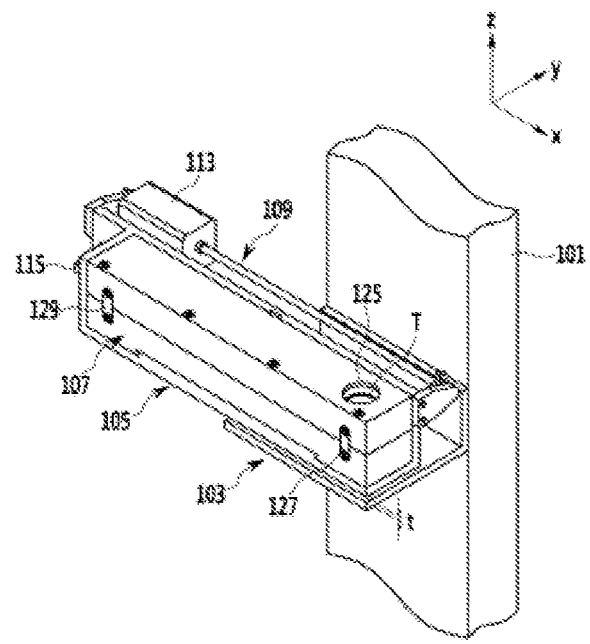
FIG. 9 is a perspective view illustrating the exterior of an apparatus for supplying a welding tip of a welder according to an embodiment of the present invention.
Figure 10:
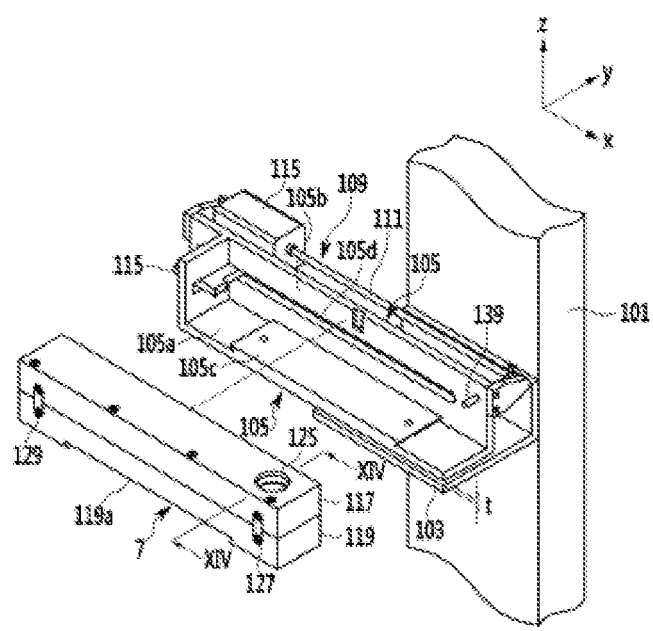
FIG. 10 is a disassembled perspective view illustrating a disassembled propping part and accommodation case of an apparatus for supplying a welding tip of a welder in FIG. 9.

FIG. 9 is a perspective view for describing an embodiment of the present invention, and FIG. 10 is a disassembled perspective view illustrating the disassembled major components in FIG. 9, while showing an apparatus for supplying a welding tip of a welder.

The apparatus for supplying a welding tip of a welder according to an embodiment of the present invention may include a support part 101, a fixed bracket 103, a propping part 105, an accommodation case 107, and a welding tip moving part 109.

The support part 101 is configured to fix an apparatus for supplying a welding tip of a welder according to an embodiment of the present invention. The apparatus for supplying a welding tip of a welder according to an embodiment of the present invention can be installed at one side or both sides of the support part 101. In this embodiment of the present invention, an occasion where it is installed at one side of the support part 101 will be described.

The fixed bracket 103 may be coupled using a welding or a bolt to the support part 101 and may be implemented in a shape where a plate shape is bent roughly in the right angle direction. The apparatus for supplying a welding tip of a welder according to an embodiment of the present invention may be installed at the fixed bracket 103.

The propping part 105 according to an embodiment of the present invention is not limited to the shape illustrated in the drawing. As long as the propping part 105 is able to insert and couple the accommodation case 107, it can be available. The structure wherein the upper and lower sides of the propping part 105 are closed, may be available. As illustrated in FIG. 10, the propping part 105 of the embodiment of the present invention will be described with reference to the occasion in FIG. 10.

The propping part 105 may be coupled to the fixed bracket 103. The propping part 105 may have a predetermined length in the direction where the accommodation case 107 is coupled and may be formed in a quadrangular box which is open at the upper surface (the z-direction in FIG. 10) and the front surface (the y-direction in FIG. 10).

As illustrated in FIG. 10, the propping part 105 may include a bottom part 105*a*, and wall surface part 105*b* which extends in the vertical direction (the z-direction in FIG. 10) from the side surface of the bottom part 105*a*. The accommodation case 107 may be coupled to the bottom part 105*a*. A protrusion part 105*c* protruding in the widthwise direction (the y-direction as in FIG. 10) may be provided at the upper surface of the bottom part 105*a*. The protrusion part 105*c* may be formed protruding at an even height higher than the other surfaces of the bottom part 105*a*. This protrusion part 105*c* may be formed on a shape protruding in the right angle direction or a dove tail shape.

The wall surface part 105*b* may be equipped with a groove 105*d* at the intermediate portion in the longitudinal direction (the x-direction in FIG. 10).

A welding tip moving part 109 may be coupled to the propping part 105. The welding tip moving part 109 may include an actuator 111, a mount 113, and a moving member 115. The actuator 111 may be formed of a pneumatic cylinder. The mount 113 is configured to move in the longitudinal direction (the x-direction in FIG. 10) by means of the actuator 111. In the embodiment of the present invention, the actuator 111 and the mount 113 have been described as being separate from each other, the actuator 111 may be a magnetic rodless cylinder or a typical rodless cylinder which is able to move the mount 113. The actuator configured to move the mount 113 in the longitudinal direction (the x-direction in FIG. 10) can be used in the embodiment of the present invention.

The moving member 115 may be coupled using a welding or an engaging member to the mount 113. If the mount 113 moves in the x-axis direction or the opposite direction thereto, the moving member 115 may move together with the mount 113. The moving member 115 is inserted in the groove 105*d* provided at the wall surface part 105*b* of the propping part 105 and can move in the x-axis direction and the opposite direction thereto along the groove 105*d*.

Figure 11:
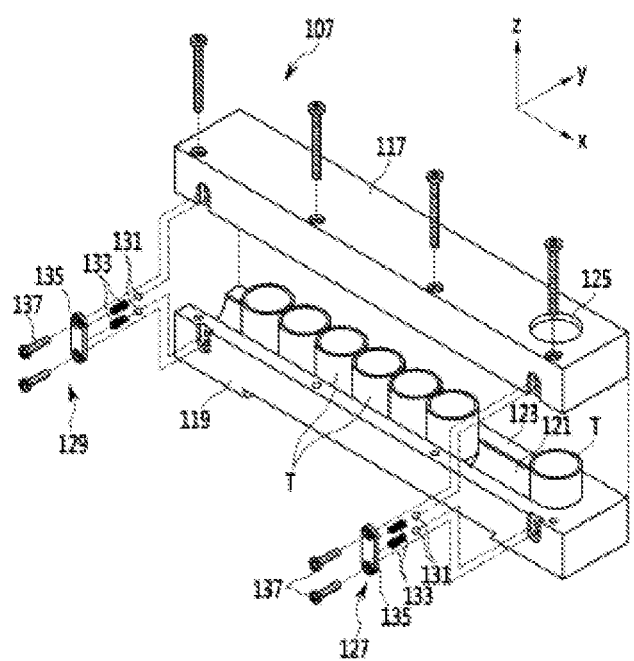
FIG. 11 is a disassembled perspective view illustrating a disassembled accommodation case according to an embodiment of the present invention.

A part of the moving member 115 may contact close with the side surface of the welding tip (T) (in FIG. 11). Namely, the portion of the moving member 115 contacting close with the welding tip (T) may be preferably formed in a curved shape same as the shape of the side surface of the welding tip (T).

Figure 12:
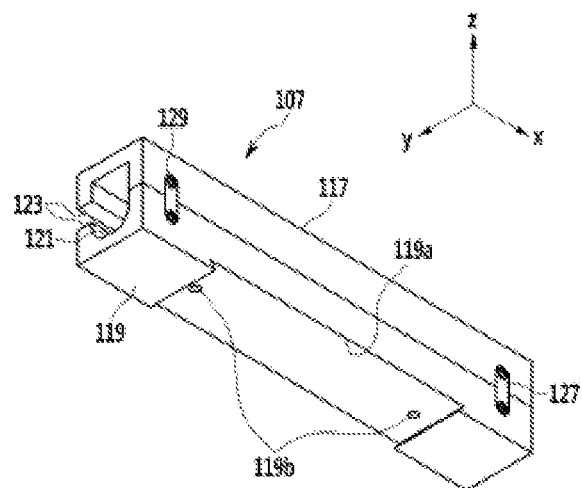
FIG. 12 is a bottom surface perspective view illustrating an accommodation case according to an embodiment of the present invention.
Figure 13:
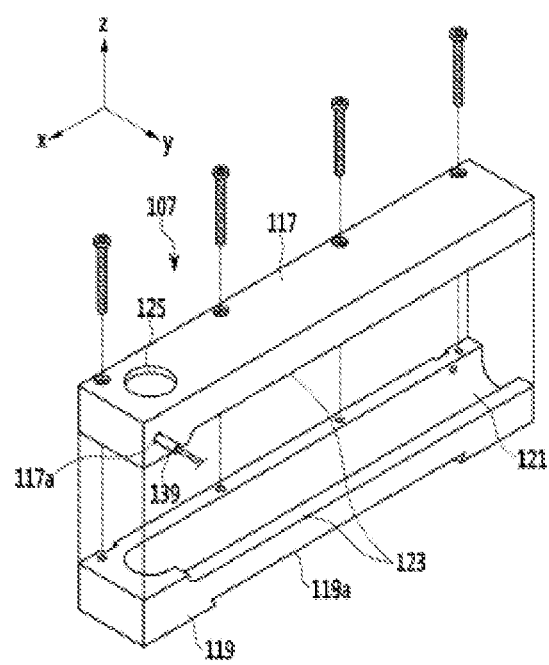
FIG. 13 is a disassembled perspective view when viewing the configuration in FIG. 11 from another direction.
Figure 14:
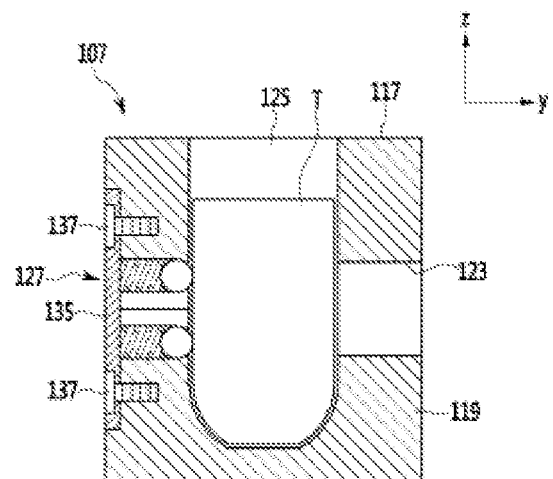
FIG. 14 is a cross sectional view taken along the line XIV-XIV in FIG. 10 according to an embodiment of the present invention.

The welding tip (T) is accommodated in the accommodation case 107. This accommodation case 107 may be formed of one member, and as illustrated in FIGS. 11 to 13, it can be manufactured in such a way that a first case 117 and a second case 119 are coupled to each other by an engaging member, for example, a bolt. In the description of the present invention, it has been described as the accommodation case 107 is divided into the first case 117 and the second case 119 for the sake of a convenient description.

The accommodation case 107 may include a welding tip accommodation groove part 121, a guide groove part 123 and a discharge port 125.

The welding tip accommodation groove part 121 is referred to a space for accommodating the welding tip (T) and may be provided inside of the accommodation case 107 in the longitudinal direction (the x-direction). The welding tip accommodation groove part 121 may be formed in such a way to carve part of the insides of the first case 117 and the second case 119 (refer to FIG. 11).

The guide groove part 123 may be provided in the longitudinal direction (the x-axis direction) of the accommodation case 107, and may be disposed in parallel with the groove 105d of the propping part 105. The moving member 115 is inserted into the guide groove part 123, and the guide groove part 123 is employed to guide the moving member 115 when the moving member 115 moves. The guide groove part 123 may be built in such a way to form a groove at a part of the portion where the first case 117 and the second case 119 are coupled, and to couple the first case 117 and the second case 119.

The discharge port 125 may be formed at the upper surface of the first case 117 (in FIG. 11). Namely, the discharge port 125 may preferably communicate with the welding tip accommodation groove part 121 and may be provided in the z-axis direction in FIG. 11. The discharge port 125 is a space through which the welding tip (T) in the welding tip accommodation groove part 121 to discharge to the outside.

Meanwhile, as illustrated in FIG. 12, a groove part 119a corresponding to the protrusion part 105c of the propping part 105 may be provided at the lower side of the second case 119. The accommodation case 107 can be easily coupled as the groove part 119a can be easily inserted into and engaged to the protrusion part 105c of the propping part 105. In the embodiment of the present invention, while it has been described that the propping part 105 is equipped with the protrusion part 105c, and the second case 119 is equipped with the groove part 119a, the configuration is not limited thereto. Alternatively, the groove part may be provided at the propping part 105c, and the protrusion part corresponding thereto may be provided at the second case 119.

The welding tip fixing parts 127 and 129 may be provided multiple in number at regular intervals at the accommodation case 107. One set formed of the welding tip fixing parts 127 and 129 may be installed at the side of the discharge port 125, and another set thereof may be installed at the portion (the opposite portion to the discharge port 125) where the welding tip (T) is inserted. These welding tip fixing parts 127 and 129 may be provided in the same structure. As an example where the welding tip fixing parts 127 and 129 are formed in the same structure, one of them will be described for the sake of convenient descriptions. As illustrated in FIG. 11, the welding tip fixing part 127 may include a ball 131, a spring 133, a fixing plate 135, and another engaging member 137.

The ball 131 may be provided in pairs disposed at regular intervals. A part of the ball 131 may pass through the accommodation case 107 and may protrude into the welding tip accommodation groove part 121. A part of the ball 131 may contact close with the side surface of the welding tip (T) disposed at the side of the discharge port 125.

The spring 133 may be provided multiple in number which is determined in response to the number of the balls 131 and is employed to contact close with the welding tip (T). This spring 133 may be preferably formed of a compressive coil spring. The fixing plate 135 can support the spring 133, and may be fixed at the accommodation case 107 using another engaging member 137.

The welding tip fixing part 127 installed at the discharge port 125 of the accommodation case 107 is employed to prevent the welding tip (T) from being easily separated toward the discharge port 125. This welding tip fixing part 127 is provided to prevent the discharge port 125 of the accommodation case 107 from being separated toward the discharge port 125 owing to the self-weigh thereof if the discharge port 125 is disposed toward the −z direction (in FIG. 11).

Meanwhile, another welding tip fixing part 129 may be installed at the portion where the welding tip (T) is inserted and is employed to prevent the welding tip (T) accommodated in the welding tip accommodation groove part 121 from being separated.

This welding tip fixing part 127 is able to maintain the state where the welding tip (T) has been disposed in the welding tip accommodation groove part 121.

The sensor 139 may be coupled to the propping part 105. The sensor 139 may be preferably formed of a proximity sensor, and it is preferably disposed at the portion where the discharge port 125 of the accommodation case 107 is formed. A hole 117a (refer to FIG. 13) into which a part of the sensor 139 is inserted, may be provided at the accommodation case 107. This hole 117a is preferably provided at the side surface of the accommodation case 107 at the portion where the discharge port 125 has been disposed. The sensor 139 is employed to detect if the welding tip (T) is present at the side of the discharge port 125. The sensor 139 may be connected to a controller (not shown) and is able to detect if the welding tip (T) is present at the side of the discharge port 125 and send a corresponding signal to the controller (not shown). The controller (not shown) is able to control a welding tip absence display part (not shown) and a robot welder driver (not shown) (a device for controlling a robot welder) in response to a signal of the sensor 139. The welding tip absence display part (not shown) may be formed of a lamp or a buzzer that the worker can confirm through.

Meanwhile, the fixed bracket 103 and the propping part 105 may be installed while maintaining regular intervals (t). A cushioning elastic member 149 may be disposed between the fixed bracket 103 and the propping part 105. The fixed bracket 103 and the propping part 105 may be coupled through another engaging member 149. The propping part 105 may relatively move by the interval (t) defined by the fixed bracket 103 and the propping part 105 (refer to FIG. 15).

Figure 15:
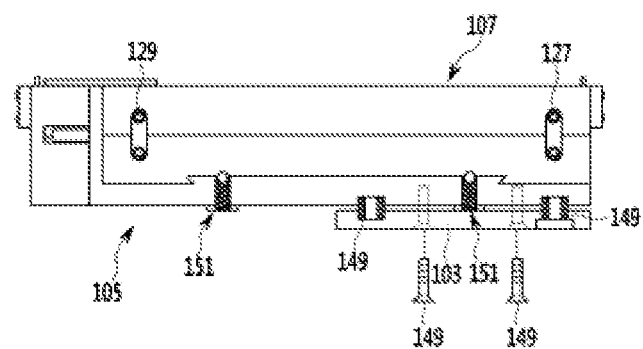
FIG. 15 is a front view for describing an engaging relationship between a fixed bracket and a propping part according to an embodiment of the present invention.

As illustrated in FIG. 15, another engaging member 149 configured to engage the fixed bracket 103 and the propping part 105 may be referred to a screw or a bolt. If the engaging member 149 is formed of a screw, a screw head passes through the lower surface of the fixed bracket 103 and is hooked by the lower surface of the fixed bracket 103, and the front end of the screw may be coupled to the propping part 105. Namely, the engaging member 149 can be movable within a predetermined section in the −z direction.

In the embodiment of the present invention, while the fixed bracket 103 and the propping part 105 have been described as being formed of the engaging member 149, for example, a screw, it is not limited thereto. Alternatively, a predetermined structure like a shaft structure wherein the fixed bracket 103 and the propping part 105 are fixed, and the propping part 105 can be movable within a predetermined section with respect to the fixed bracket 103 may be available.

In the propping part 105, a ball plunger 151 configured to prevent the movement of the accommodation case 107 may be installed at the lower surface of the bottom part 105a. Moreover, an engaging groove 119b corresponding to the ball plunger 151 may be provided at the bottom surface of the accommodation case 107. This configuration may contribute to a state where the accommodation case 107 has been stably engaged to the propping part 105 if the accommodation case 107 is inserted in the propping part 105.

In the thusly constituted embodiment of the present invention, the procedure where the welding tip (T) is discharged after the welding tip (T) has been inserted in the accommodation case 107 and has been installed at the propping part 105, will be described.

First, the worker sequentially inserts the welding tips (T) into the welding tip accommodation groove part 121 at one side of the accommodation case 107 (the x-direction in FIG. 11). The welding tips (T) disposed at the side of the discharge port 125 can be supported by the ball 131 of the welding tip fixing part 127 disposed at the side surface of the accommodation case 107. If the discharge port 125 is disposed in the −z direction, the aforementioned configuration may prevent the welding tip (T) from falling due to the self-weight thereof toward the discharge port 125. Another welding tip fixing part 129 will support the side surface of the finally inserted welding tip (T) and may prevent the welding tip (T) from being separated to the inputted portion, namely, the separation thereof in the −x direction can be prevented. This configuration is able to prevent the welding tip (T) from separating from the accommodation case 107 if the welding tips (T) are moved after they have been accommodated in the accommodation case 107.

Next, the worker will insert the accommodation case loaded with the welding tips (T) into the propping part 105. At this time, the groove part 119a of the accommodation case 107 may be adjusted to the protrusion part 105c provided at the bottom part 105a of the propping part 105 and may be moved in the y-direction as in FIG. 8, thus coupling the accommodation case 107 to the propping part 105. The ball plunger 151 provided at the propping part 105 will be hooked by the engaging groove 119b provided at the lower side of the accommodation case 107, and then the accommodation case 107 can be fixed at the propping part 105.

In this state, the robot welder (not illustrated) and the shank (not illustrated) will move, and the welding tip (T) will be ejected from the discharge port 125. If the shank allows to eject the welding tip (T), and a part of the shank passes through the discharge port 125 and presses the welding tip (T), the accommodation case 107 may move in the −z direction (refer to FIG. 10). A cushioning force can be generated due to the cushioning elastic member 147 disposed between the fixed bracket 103 and the propping part 105, by which the welding tip is replaced, and the accommodation case 107 will position in place.

The cushioning operation of the propping part 105 may contribute to the enhanced stability by reducing the impacts to the robot welder (not illustrated).

The sensor 139 will sense the state where the welding tip (T) is not present at the side of the discharge port 125 and transmit a signal to the controller (not shown). The controller (not shown) will control the actuator 111 of the welding tip moving part 109 in response to a signal of the sensor 139. If the actuator 111 is operated with a pneumatic, the controller (not shown) will carry out a control to open or close the pneumatic valve (not illustrated). So, the mount 113 will move in the y-direction (the direction toward the discharge port 125), and at the same time, the moving part 115 will move in the y-direction (the direction toward the discharge port 125), so the moving member 115 will cause the welding tip (T) disposed nearest the same to move in the y-direction (the direction toward the discharge port 125). Next, all the welding tips (T) will move in the y-direction (the direction toward the discharge port 125), and the places from which the welding tips have been discharged to the outside, will be filled with other welding tips (T). As this procedure is repeatedly carried out, the welding tips (T) can be continuously supplied to the discharge port 125.

If the welding tip (T) is not present at the side of the discharge port 125, the sensor 139 will detect such a situation and send a signal to the controller (not shown). The controller (not shown) may allow to drive the lamp or buzzer of the welding tip absence display part (not shown) so as to inform to the worker. At the same time, the controller (not shown) may temporarily stop the welding tip replacing work in such a way to control the robot welder driver (not shown) (the device for driving a robot welder).

The embodiment of the present invention can be implemented in a simplified structure, and the welding tips can be continuously supplied, and at the same time the worker is able to easily and detachably attach the accommodation case 107 to the propping part 105, whereby the work is convenient, and the productivity can be enhanced.

Moreover, in the embodiment of the present invention, if the welding tip (T) which will be replaced, is not present at the side of the discharge port 125, the sensor 139 may detect such a situation, and may operate the lamp or buzzer of the welding tip absence display part (not shown) or may stop the operation where the robot welder is carrying out the welding tip replacing work, thus preventing any welding tip replacing error.

In the embodiment of the present invention, the direction of the discharge port 125 through which the welding tip (T) is discharged, may be determined to the upward direction or the downward direction, so the moving trajectory of the robot welder can be minimized, and the welding tip replacing work time can be reduced, thus enhancing productivity.

Figure 16:
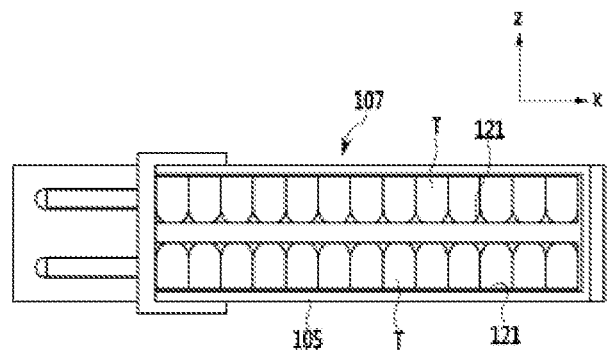
FIG. 16 is a view for describing another example of an embodiment of the present invention.

FIG. 16 is a view for describing another example of the embodiment of the present invention and is a front view of another example of an apparatus for supplying a welding tip of a welder. In the example of the embodiment of the present invention in FIG. 16, the same portions as the above-described portions will be omitted from the descriptions, and only the different portions will be described.

Another example of the embodiment of the present invention is referred to the example wherein each welding tip (T) is disposed in the opposite direction in the upward and downward directions (the z-direction) in one accommodation case 107. Namely, in another example of the embodiment of the present invention, two welding tip accommodation groove parts 121 provided inside of the accommodation case 107 are provided in parallel. In another example of the embodiment of the present invention, the welding tip (T) can be discharged in different directions from one accommodation case 107 in such a way that the welding tips (T) are disposed in the opposite directions.

In this configuration, the welding tips (T) are inserted opposite to the shank of the robot welder, so two welding tips (T) can be simultaneously replaced. In another example of the embodiment of the present invention, two welding tips (T) can be simultaneously replaced while reducing the number of components in such a way to use one accommodation case 107, so the Tack time of work can be more reduced.

Figure 17:
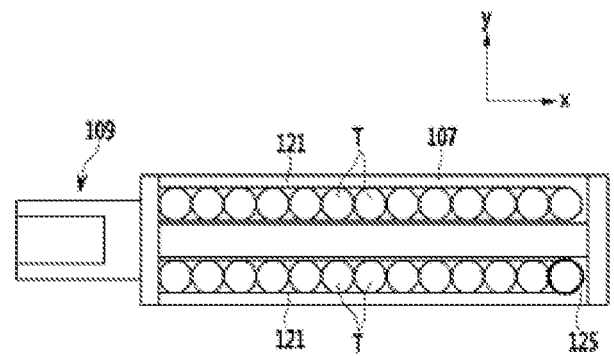
FIG. 17 is a view for describing further another example of an embodiment of the present invention.

FIG. 17 is a view for describing another example of the embodiment of the present invention, and is a plane view illustrating another example of an apparatus for supplying a welding tip of a welder. In this another example of the embodiment of the present invention, the same description on the same component will be omitted, and only difference will be described. In further another example of the embodiment of the present invention, it shows that the welding tips (T) are disposed in parallel in one accommodation case 107. In the further another example of the embodiment of the present invention, two welding tip accommodation groove parts 121 are provided in parallel in the inside of the accommodation case 107. In the further another example of the embodiment of the present invention, there is a difference in the way that the welding tips (T) are disposed in the same direction. Since the welding tips (T) are disposed in two lines in parallel, more welding tips (T) can be accommodated in the accommodation case 107. This configuration may contribute to the reduced replacing number of the welding tips (T) in the accommodation case 107, thus enhancing a productivity. The further another example of the embodiment of the present invention is able to more reduce the Take time of work.

FIGS. 18 to 22 are views for describing another embodiment of an apparatus for supplying a welding tip of a welder according to the present invention.

Figure 18:
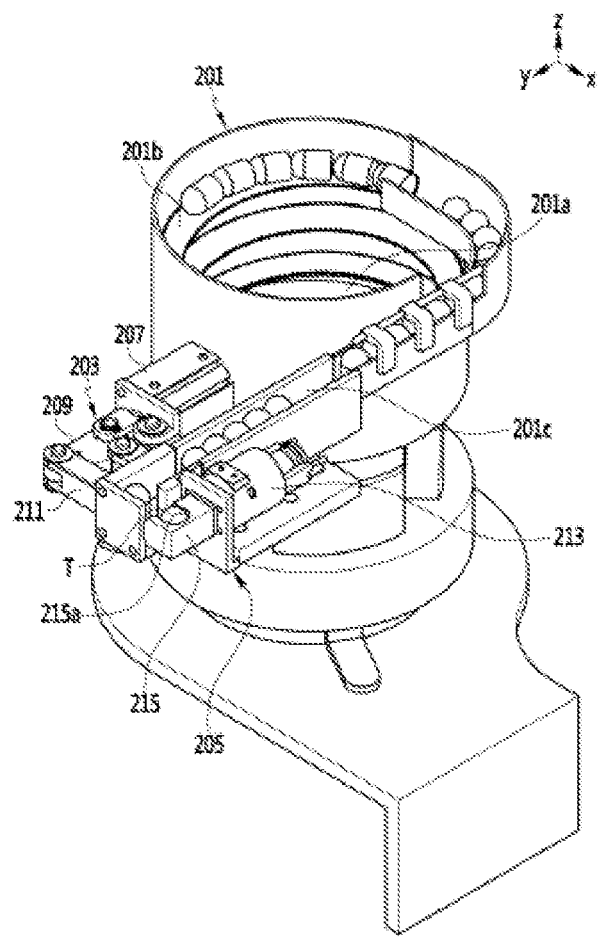
FIG. 18 is a perspective view illustrating an apparatus for supplying a welding tip of a welder so as to describe a first example of further another embodiment of the present invention.
Figure 19:
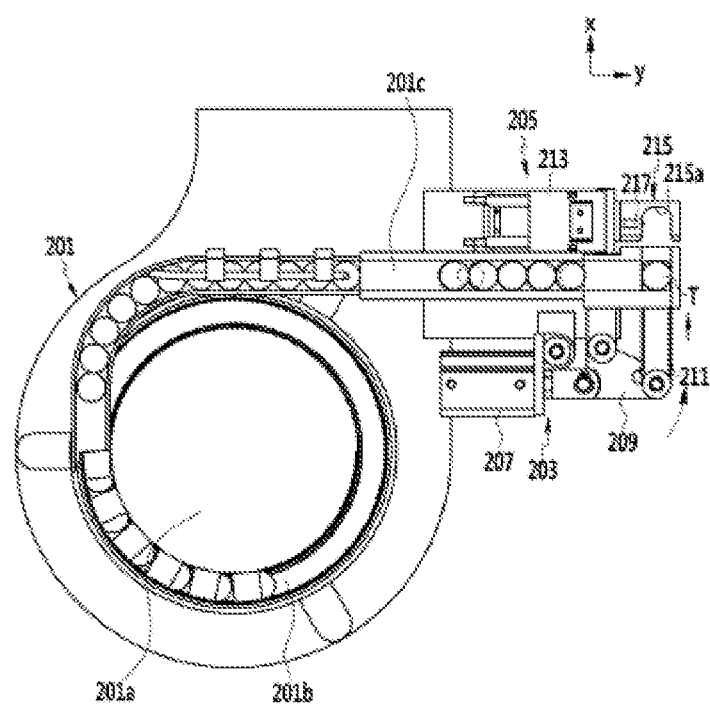
FIG. 19 is a plane view of FIG. 18.
Figure 20:
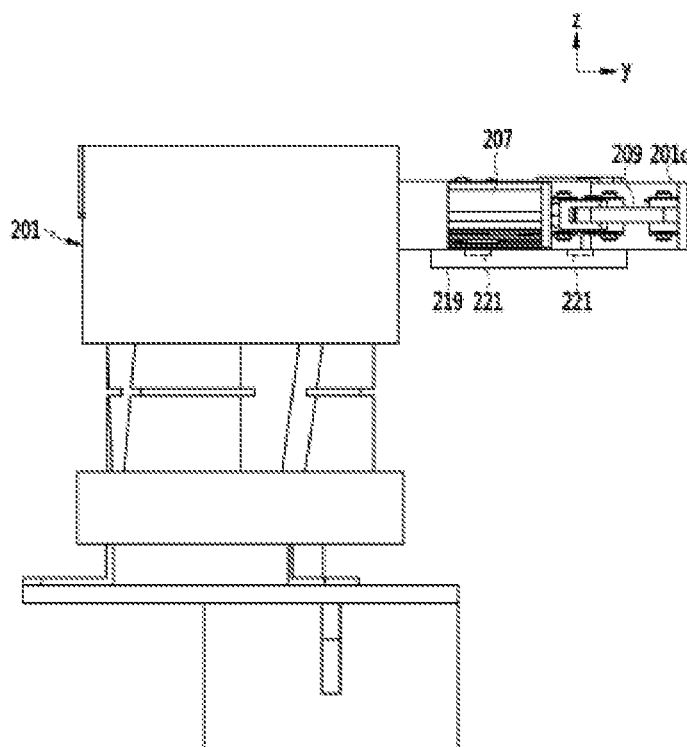
FIG. 20 is a side view of FIG. 18.

FIG. 18 is a perspective view for describing an embodiment of the present invention, and FIG. 19 is a plane view of FIG. 18, and FIG. 20 is a side view of FIG. 18 while showing an apparatus for supplying a welding tip of a welder.

The apparatus for supplying a welding tip of a welder according to the embodiment of the present invention may include an aligning part 201, a discharge part 203, and a fixing part 205.

The aligning part 201 is referred to a device which is able to align the welding tips (T) and sequentially discharge them. This aligning part 201 may be formed of a bowl type vibration feeder. The vibration feeder may include a bowl 201a, and a vibration generator (not illustrated) may be installed at the lower surface of the bowl 201a. A spiral track 201b may be installed at the bowl 201a, and a straight line type track 201c may extend from the spiral track 201b into a straight line.

The vibration feeder adapted to the aligning part 201 of the present invention may allow the welding tips (T) move along the spiral track 201b with the aid of the vibrations from the vibration generator, and then may allow the welding tips (T) to move along the straight line track 201c and to be aligned.

The discharge part 203 may be installed at one side of the aligning part 201, and is employed to supply the welding tips (T) aligned by the aligning part 201 to be supplied at regular time intervals to the fixing part 205. The discharge part 203 may include a discharge actuator 207, a connection link 209, and a pressing member 211.

The discharge actuator 207 may be formed of a pneumatic cylinder the axis of which moves linearly.

One side of the connection link 209 may be hingedly coupled to the shaft of the discharge actuator 207, and the other side thereof may be hingedly coupled to the aligning part 201. In this connection link 209, if the discharge actuator 207 operates, it can rotate about the hinge engaging part coupled to the aligning part 201. The connection link 209 is able to move the pressing member 211 in the right angle direction with respect to the straight line moving direction of the shaft of the discharge actuator 207.

The pressing member 211 may be hingedly coupled to one side of the connection link 209, and the pressing member 211 is disposed to pass through in the right angle direction the straight line track 201c of the aligning part 201. Namely, a hole (or a space) passing through the side surface may be formed at the straight line track 201c of the aligning part 201, and the pressing member 211 may be inserted into the hole. The front end of the pressing member 211 may contact with the side surface of the welding tip (T), so it can push the welding tip (T) and transfer it to the fixing part 205.

In other words, in the pressing member 211, if the discharge actuator 207 is driven, the shaft provided at the actuator will move in the straight line direction, and the connection link 209 will rotate and move toward the side surface of the straight line track 201c of the aligning part 201 and push the welding tip (T) to the fixing part 205.

In the embodiment of the present invention, the discharge part 203 is not limited to the aforementioned embodiment. As long as any discharge part is configured in a structure where the welding tip (T) at the straight line track 201c of the aligning part 201 could be pushed toward the fixing part 205 by means of the pressing member 211, it can be available.

The fixing part 205 is able to supply one by one the welding tip (T) to the robot welder while temporarily holding the welding tips (T) which are aligned at the aligning part 201. This fixing part 205 may include a driving source 213m and a welding tip holding part 215.

The driving source 213 may be formed of a motor which is able to rotate the shaft. The driving source 213 of the embodiment of the present invention is not limited thereto. Alternatively, it may be formed of a pneumatic actuator, etc. which is able to rotate the shaft.

The welding tip holding part 215 may rotate engaged to the shaft provided at the driving source 213. Namely, the welding tip holding part 215 may be configured in such a way that the portion thereof inserted into the shank provided at the front end of the robot welder rotates in the downward direction or the upward direction.

The welding tip holding part 215 may be provided with an accommodation groove part 215a into which the welding tip (T) is inserted. The welding tip holding part 215 may be provided with a ball plunger 217. The ball plunger 217 is employed to temporarily fix the welding tip (T) inserted in the accommodation groove part 215a. This ball plunger 217 is preferably installed passing through a part of the side surface of the accommodation groove part 215a from the welding tip holding part 215.

Figure 21:
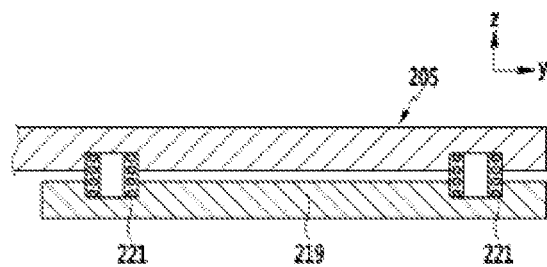
FIG. 21 is a view for describing a configuration to absorb the impacts which are applied to an apparatus for supplying a welding tip of a welder according to an embodiment of the present invention.

Meanwhile, as illustrated in FIG. 21, a fixed bracket 219 may be installed at the lower surface side of the fixing part 205. The fixed bracket 219 may be preferably coupled to a support part (not illustrated) like a pillar. Moreover, the cushioning elastic member 221 may be preferably installed between the lower surface of the fixing part 205 and the fixed bracket 219. The cushioning elastic member 221 may be formed of an elastic body like a compressive coil spring. The configuration of this fixing part 205 is employed to absorb the instant impacts from the fixing part 205 wherein the welding tip (T) is inserted in the shank portion of the robot welder.

The operation of the first example of the embodiment of the present invention will be described.

First, a user may input a lot of welding tips (T) into the bowl 201a of the aligning part 201 and then drives the vibration generator (not illustrated) of the aligning part 201. The welding tips (T) will be aligned while moving along the spiral track 201b and the straight line track 201c. If the aligned welding tips (T) position at the front end of the straight line track 201c, the discharge actuator 207 of the discharge part 203 will be driven. While moving linearly, the shaft of the discharge actuator 207 causes the connection line 209 to rotate in the counterclockwise direction in FIG. 2. As the connection link 209 rotates and moves, the pressing member 211 will move in the straight line arrow direction in FIG. 19. While the pressing member 211 is moved, it will push the welding tip (T) disposed at the front end of the straight line track 201c of the aligning part 201 into the accommodation groove part 215a of the welding tip holding part 215 of the fixing part 205, so the welding tip (T) can be inserted into the accommodation groove part 215a provided at the welding tip holding part 215. Since the ball plunger 217 is installed at the welding tip holding part 215, the welding tip (T) can remain fixed at the accommodation groove part 215a of the welding tip holding part 215 (refer to FIG. 22).

In this state, the welding tip (T) will be inserted into one shank among a pair of the shanks which have become opposed to each other as the robot welder approaches. One side of the welding tip (T) may be provided at the insertion hole (not illustrated), and may be inserted into the portion of the shank of the robot welder. If any impact occurs due to the force that the robot welder applies, the cushioning elastic member 221 will absorb such impacts (refer to FIG. 21).

Continuously, the discharge part 203 will push another welding tip (T) in the same way from the straight line track 201c of the aligning part 201 and will push it into the accommodation groove part 215a provided at the welding tip holding part 215 of the fixing part 205. In a state where the welding tip (T) has been fixed at the accommodation groove part 215a of the welding tip holding part 215, the driving source 213 of the fixing part 215 will be driven. The welding tip holding part 215 will rotate 180°, and the insertion hole of the welding tip (T) will face upward (in FIG. 18). In this state, the welding tip (T) will be inserted into any of the shanks of the robot welder. This procedure may be repeatedly carried out, so the welding tips (T) can be continuously supplied to the robot welder.

In the embodiment of the present invention, since the welding tips can be continuously supplied to the robot welder, it can be possible to prevent the manufacturing line from stopping, which may occur if the supply of the welding tip is interrupted, and the number of the work processes can be reduced, and the productivity can be improved.

Figure 23:
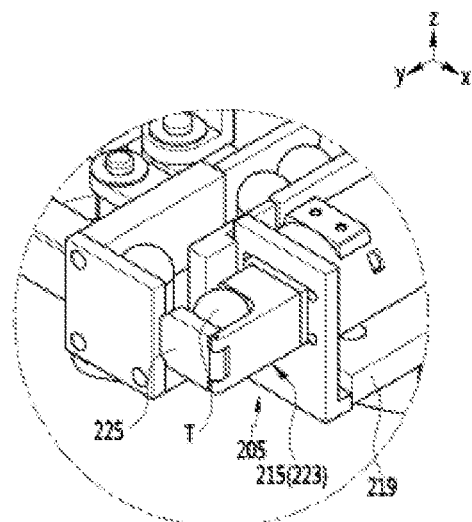
FIG. 23 is a perspective view for describing a second example of still further another embodiment of the present invention.
Figure 24:
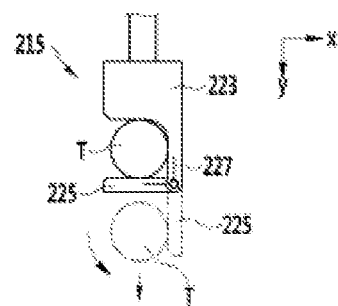
FIG. 24 is a view for describing the operation procedures in FIG. 23.

FIG. 23 is a perspective view for describing the second example of further another embodiment of the present invention, and FIG. 24 is a view for describing the operation procedure in FIG. 23 while showing the fixing part 205 of the apparatus for supplying a welding tip of a welder.

In the descriptions of the second example of the embodiment of the present invention, the descriptions on the same components will be omitted, and only a difference will be described. In the second example of the embodiment of the present invention, the same components as the components described in the previous embodiment will be given the same reference numbers.

The welding tip holding part 215 of the fixing part 205 of the second example of the embodiment of the present invention may include a fixing member 223, a rotation member 225, and an elastic member 227.

The fixing member 223 of the welding tip holding part 215 may be rotated after it has been coupled to the driving source. The fixing member 223 may become a part of the accommodation groove part 215a. The rotation member 225 may be hingedly coupled to the fixing member 223. The rotation member 225 may form the remaining portions of the accommodation groove part 215a and may form an accommodation groove part 215a into which the welding tip (T) is inserted, in a state where it has been hingedly coupled to the fixing member 223. The rotation member 225 can rotate with respect to the fixing member 223 in the direction that the accommodation groove part 215a can be opened. The elastic member 227 may be installed at the fixing member 223 and the rotation member 225, and an elastic force can be provided, which is able to maintain the shape of the accommodation groove part 215a as the fixing member 223 and the rotation member 225 get together. This elastic member 227 may be formed of a torsion spring.

In the second example of the embodiment of the present invention, the welding tip (T) can be ejected from the fixing part 205 through the operation in the robot welder wherein the welding tip (T) is moved in the arrow direction in FIG. 24 after it has been inserted into the shank. The welding tip (T) can be easily separated from the accommodation groove part 215a while pushing away the rotation member 225 while overcoming the elastic force of the elastic member 227.

In the second embodiment of the embodiment of the present invention, the rotation member 225 and the elastic member 227 may allow to fix the welding tip (T) accommodated in the accommodation groove part 215a. Since the welding tip (T) can be fixed in place without separately installing the ball plunger 217 at the welding tip holding part 215, the more reliable configuration can be implemented in the present invention.

Figure 25:
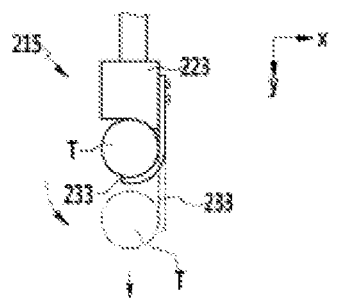
FIG. 25 is a view for describing a third example of still further another embodiment of the present invention.

FIG. 25 is a view for describing a third example of the embodiment of the present invention while showing the fixing part 205 of the apparatus for supplying a welding tip of a welder.

Since the description of the third example of the embodiment of the present invention is same as the contents of the descriptions of the previous embodiment, the same descriptions will be omitted, and only a difference will be described. In the third example of the embodiment of the present invention, the same components as in the descriptions of the embodiment will be given the same reference numbers as the previously described embodiments.

In the second example of the embodiment of the present invention, while it has been described that the welding tip holding part 215 of the fixing part 205 is formed of the fixing member 223 and the rotation member 225, there is a difference in the way that it is formed of three members in the third example of the embodiment of the present invention. More specifically, in the third example of the embodiment of the present invention, the welding tip holding part 215 of the fixing part 205 may be formed of a fixing member 223, a first rotation member 229, and a second rotation member 231. In other words, the fixing member 223 is coupled to the shaft of the driving source 213, and the first rotation member 229 is hingedly coupled to the fixing member 223, and the second rotation member 231 is hingedly coupled to the first rotation member 229. Moreover, an elastic member 227 formed of a torsion spring may be disposed between the fixing member 223 and the first rotation member 229, and the first rotation member 229 and the second rotation member 231. If the fixing member 223, the first rotation member 229 and the second rotation member 231 get together by means of the elastic force of the elastic member 227, the welding tip holding part 215 can be made, wherein the accommodation groove part 215a into which the welding tip (T) is inserted, can be formed.

Since the operational procedure of the third example of the embodiment of the present invention is similar with the second example, the descriptions thereof will be omitted. The third embodiment of the present invention shows that the present invention may be implemented in various forms.

Figure 26:
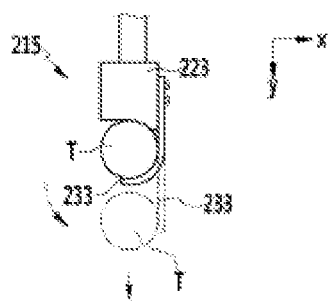
FIG. 26 is a view for describing a fourth example of still further another embodiment of the present invention.

FIG. 26 is a view for describing a fourth example of the embodiment of the present invention, while showing the fixing part 205 of the apparatus for supplying a welding tip of a welder. The descriptions of the fourth example of the embodiment of the present invention is same as the descriptions of the previous embodiment, so only a difference will be described. The same components as in the descriptions of the previous embodiment will be given the same reference numbers as the reference numbers of the previous embodiment.

The welding tip holding part 215 of the fixing part 205 of the fourth example of the embodiment of the present invention may include a fixing member 223, and an elastic plate 233. The elastic plate 233 may be coupled to the fixing member 223 through an engaging member, for example, a bolt, a screw, etc. The elastic plate 233 may be bent and is equipped with an accommodation groove part 215a. The fourth example of the embodiment of the present invention may operate in the same way as or similar way with the second example of the embodiment. The fourth example of the embodiment of the present invention may contribute to the implementation of the present invention in the simplified way, thus reducing the manufacturing cost.

Figure 27:
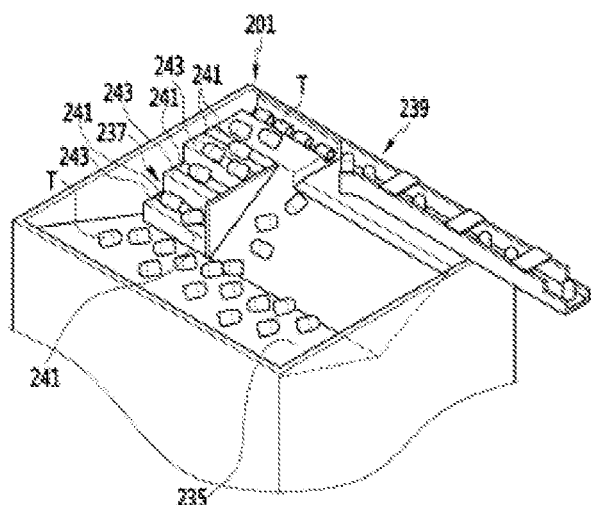
FIG. 27 is a view for describing a fifth example of still further another embodiment of the present invention.
Figure 28:
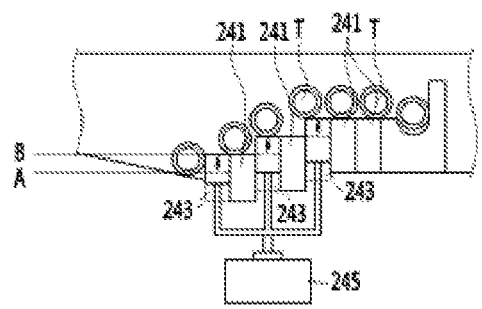
FIG. 28 is a view for describing an operation procedure in FIG. 27.

FIG. 27 is a perspective view schematically illustrating the major components of the fifth example of the embodiment of the present invention, and FIG. 28 is a view for describing the operation state, while showing the aligning part 201 of the apparatus for supplying a welding tip of a welder.

The description of the fifth example of the embodiment of the present invention is same as the descriptions of the previous embodiment, so only a difference will be described. The same components as in the descriptions of the previous embodiment will be given the same reference number as the reference numbers of the previous embodiments.

In the first example of the embodiment of the present invention, while it has been described that the aligning part 201 is formed of a vibration feeder of the bowl type, the aligning part 201 of the fifth example of the embodiment of the present invention is equipped with a straight line type welding tip moving part which is shaped like a stair. Namely, the aligning part 201 of the fifth example of the embodiment of the present invention may include a welding tip accommodation part 235, a welding tip moving part 237, a welding tip guide part 239 and a vibration generator (not illustrated).

The welding tip accommodation part 235 is a space for accommodating the welding tips (T) and may be configured in such a way that the inner side thereof is inclined into a concave shape.

The welding tip moving part 237 is configured to move the welding tip (T) in the upward direction and transfer it to the welding tip guide part 239. The welding tip moving part 237 may include a plurality of fixing blocks 241, a plurality of moving blocks 243, and a block movement actuator 245.

The fixing blocks 241 may be disposed at one side of the welding tip accommodation part 235, and the heights thereof may gradually increase in the directions of the welding tip guide part 239. The fixing blocks 241 may be disposed in a stair shape at regular intervals.

The moving block 243 may be disposed between the fixing blocks 241. The moving block 243 can move upward and downward in FIG. 28. If the moving block 243 is moved upward, it can move up to the same heights as the fixing blocks 241 which are disposed nearby. This moving block 243 can move upward or downward by means of the block moving actuator 245 (refer to FIG. 28). As the moving block 243 moves upward or downward, the welding tip (T) can move in a state where it has been put on the fixing block 241 and the moving block 243. The welding tips (T) which are moving in the aforementioned way, can be transferred to the welding tip guide part 239 and can be aligned. The upper surfaces of the fixing block 241 and the moving block 243 may be horizontal or may be inclined downward in the direction of the welding tip guide part 239.

The welding tip guide part 239 is employed to receive and align the welding tips (T) which have passed through the welding tip moving part 237. The alignment of the welding tips (T) at the welding tip guide part 239 may be carried out through a typical structure.

A vibration generator (not illustrated) may be provided at the side of the aligning part 201 of the apparatus for supplying a welding tip of a welder of the fifth example of the embodiment of the present invention. The vibration generator may allow to move the welding tips (T) by supplying a torsion vibration to the welding tip accommodation part 235, the welding tip moving part 237 and the welding tip guide part 239.

In the fifth example of the embodiment of the present invention, the welding tip (T) accommodated in the welding tip accommodation part 235 is placed on the moving block 243 of the welding tip moving part 237, and the moving block 243 ascends and moves the welding tip (T) to the top of the fixing block 241. The welding tips (T) move like sequentially moving over the stair and are transferred to the welding tip guide part 239 and are aligned. The aligning part 201 of the apparatus for supplying a welding tip of a welder of the fifth example of the embodiment of the present invention can be implemented in various ways.

Figure 29:
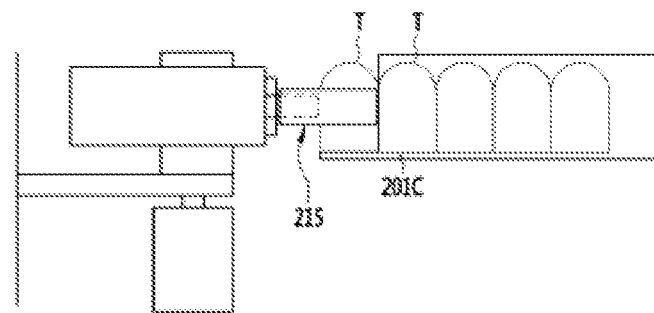
FIG. 29 is a side view for describing a sixth example of still further another embodiment of the present invention.
Figure 30:
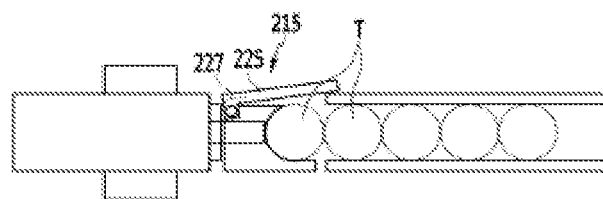
FIGS. 30 and 31 are plane views for describing an operation procedure in FIG. 29.
Figure 31:
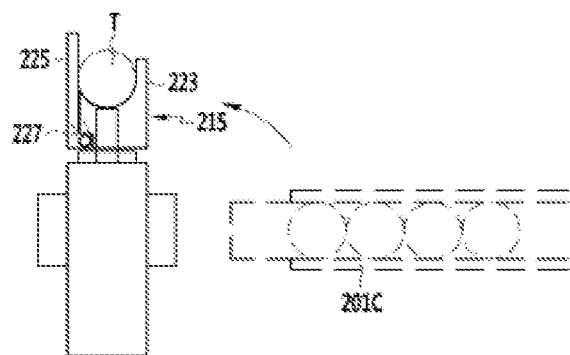

FIG. 29 is a side view schematically illustrating the major components of the sixth example of the embodiment of the present invention. FIGS. 30 and 31 are views for describing the sixth example of the embodiment of the present invention, while showing the fixing part 205. As compared to the descriptions of the previous example, the descriptions of the sixth example of the embodiment of the present invention are same as the description of the previous example, so only a difference will be descried. In the sixth example of the embodiment of the present invention, the same components as in the descriptions of the previous embodiment will be given the same reference to number as in the previous embodiment.

The fixing part 205 of the sixth example of the embodiment of the present invention may be disposed on the same straight line as the straight line track 201c of the aligning part 201. The fixing part 205 of the sixth example of the embodiment of the present invention may include a driving source 247, and a welding tip holding part 215.

The driving source 247 may be formed of a motor, etc. and is able to rotate the welding tip holding part 215 in the counterclockwise direction or the clockwise direction (FIGS. 30 and 31). The welding tip holding part 215 may include a fixing member 223, and a rotation member 225 which is coupled to the fixing member 223. The rotation member 225 may be hingedly coupled to the fixing member 223.

Moreover, an elastic member 227 may be installed at the fixing member 223 and the rotation member 225. The elastic member 227 may be preferably installed for the elastic force to be applied in the direction where the rotation member 225 is moved in the direction of the fixing member 223.

The front end of the rotation member 225 is preferably longer than the length of the front end of the fixing member 223. This configuration of the rotation member 225, as illustrated in FIG. 30, may allow the welding tip (T) to be easily held.

Figure 22:
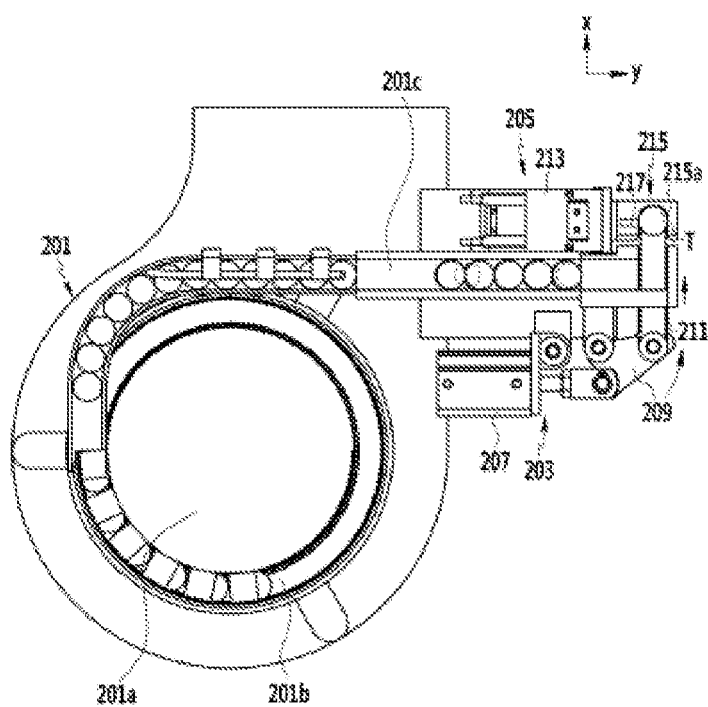
FIG. 22 is a view for describing a state where a discharge part through which welding tips are discharged, according to still further another embodiment of the present invention.

In the sixth example of the embodiment of the present invention having such a configuration, as illustrated in FIG. 30, the fixing member 223 and the rotation member 225 may be contacted close with the front end of the straight line track 201c. The welding tip (T) which has moved along the straight line track 201c can move between the fixing member 223 and the rotation member 225 and can be disposed in place. As illustrated in FIG. 30, the rotation member 225 is supported by one side of the straight line track 201c, thus defining a space through which the welding tip (T) can enter between the fixing member 223 and the rotation member 225. The driving source 247, as illustrated in FIG. 22, causes the welding tip holding part (215) to rotate in the counterclockwise direction (the arrow direction), and the rotation member 225 will move toward the fixing member 223 by means of the elastic member 227, so the welding tip (T) can be held. In this state, the separate welding tip (T) will become a state where it can replace the welding tip (T).

In another example of the sixth example of the embodiment of the present invention, the rotation member 225 may be formed of a leaf spring and may be coupled to the fixing member 223. In this case, the aforementioned spring 227 may be removed. The rotation member 225 formed of a leaf spring can be coupled to the fixing member 223, thus providing the same function operation as in the sixth example of the embodiment of the present invention.

The sixth example of the embodiment of the present invention shows that the present invention can be implemented in various ways.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

What is claimed:

1. An apparatus for supplying a welding tip of a welder, comprising:
    a propping part;
    an accommodation case which is coupled to the propping part, wherein welding tips are accommodated in the accommodation case; and
    a welding tip moving part which is coupled to the propping part and is configured to move the welding tips accommodated in the accommodation case,
    wherein the welding tip moving part includes:
        an actuator; and
        a moving member which is configured to move the welding tip to one side with the aid of the actuator, and
    wherein the accommodation case includes:
        a welding tip accommodation groove part which is provided in the inside thereof in the longitudinal direction, wherein the welding tips are inserted into the welding tip accommodation groove part;
        a guide groove part which is provided at the side surface in the moving direction of the welding tip and is able to guide the moving member; and
        a discharge port which is coupled to the welding tip accommodation groove part, wherein the welding tip is discharged through the discharge port.

2. The apparatus of claim 1, wherein the accommodation case is provided with a welding tip fixing part which is able to limit the movement of the welding tip.

3. The apparatus of claim 2, wherein the welding tip fixing part is installed at the accommodation case and is formed of a ball plunger.

4. The apparatus of claim 1, wherein the accommodation case is provided with a sensor which is disposed at the side of the discharge port thereof and is able to detect if the welding tip is present or not and transmits a detected signal to a controller.

5. The apparatus of claim 1, wherein the accommodation case is provided with a groove part or a protrusion part, and the propping part is provided with another protrusion part or another groove part which is inserted in response to the groove part or the protrusion part.

6. The apparatus of claim 1, wherein the propping part is coupled to a fixed bracket fixed at a support part, and the propping part and the fixed bracket are disposed at an interval from each other, and a cushioning elastic member is disposed between the propping part and the fixed bracket.

\* \* \* \* \*